United States Patent
Morig et al.

(10) Patent No.: US 7,325,793 B2
(45) Date of Patent: Feb. 5, 2008

(54) METHOD FOR MAKING A ROLLING-LOBE AIR SPRING AND APPARATUS THEREFOR AND A ROLLING-LOBE AIR SPRING HAVING A FLANGED PLATE

(75) Inventors: Gerd Morig, Seelze (DE); Wolfgang Gnirk, Lehrte (DE); Bernd Reich, Neustadt (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 11/442,285

(22) Filed: May 30, 2006

(65) Prior Publication Data

US 2007/0006633 A1   Jan. 11, 2007

Related U.S. Application Data

(63) Continuation of application No. PCT/EP2004/052744, filed on Nov. 1, 2004.

(30) Foreign Application Priority Data

Nov. 27, 2003 (DE) ............................... 103 55 441

(51) Int. Cl.
*F16F 9/04* (2006.01)
*B21B 45/00* (2006.01)
*B21B 22/00* (2006.01)

(52) U.S. Cl. ................... 267/64.23; 72/46; 72/352

(58) Field of Classification Search ................ 72/273, 72/343, 352, 361, 420; 29/511, 520; 267/64.23, 267/64.24, 64.27
See application file for complete search history.

(56) References Cited

U.S. PATENT DOCUMENTS

| 2,874,458 | A |   | 2/1959  | Smith |
| 5,253,850 | A |   | 10/1993 | Burkley et al. |
| 5,566,929 | A | * | 10/1996 | Thurow .................... 267/64.27 |
| 6,345,813 | B1 | * | 2/2002 | Trowbridge .............. 267/64.27 |

FOREIGN PATENT DOCUMENTS

| DE | 44 23 885 | 1/1996 |
| WO | WO 01/27905 | 4/2001 |

* cited by examiner

*Primary Examiner*—Derris H. Banks
*Assistant Examiner*—Teresa M. Bonk
(74) *Attorney, Agent, or Firm*—Walter Ottesen

(57) ABSTRACT

A flanged plate (1) for a rolling-lobe air spring has on its rounded portion an annular, closed, concave, rounded holding recess (13) which has a circular arcuate shape. The plate is provided with the recess before surface treatment. A correspondingly shaped holding bead (16) in the upper flanging tool (3) engages in this holding recess and form-tightly holds the tool (3) and the flanged plate (1). In this way, sharp-edged holding grooves, which can damage the surface of the flanged plate, are unnecessary. The flanging method, the flanging device, the flanged plate and the rolling-lobe air spring provided with a flanged plate of the above type are described.

3 Claims, 4 Drawing Sheets

METHOD FOR MAKING A ROLLING-LOBE AIR SPRING AND APPARATUS THEREFOR AND A ROLLING-LOBE AIR SPRING HAVING A FLANGED PLATE

RELATED APPLICATION

This application is a continuation application of PCT patent application PCT/EP 2004/052744, filed Nov. 1, 2004, designating the United States and claiming priority from German patent application no. 103 55 441.6, filed Nov. 27, 2003, the entire contents of both applications being incorporated herein by reference.

FIELD OF THE INVENTION

The invention relates to a method for making a rolling-lobe air spring having a rolling-lobe resilient member and a flanged plate having a rim and a base wherein the flanged plate is placed in a lower tool and an upper flanging tool presses the flanged plate into the lower flanging tool. The rim of the flanged plate is formed to define a torus and the rim of the flanged plate successively encloses a bead of the rolling-lobe resilient member. An apparatus is provided which has an upper and lower flanging tool for carrying out the method of making the rolling-lobe air spring. The flanged plate has a rim and a base for a rolling-lobe air spring and the rolling-lobe air spring has a rolling lobe and a flanged plate.

BACKGROUND OF THE INVENTION

Air springs, as they are used in the manufacture of motor vehicles for spring mounting wheel suspensions, include essentially a rolling-lobe resilient member. The rolling-lobe resilient member is delimited at one end by a cover plate and, at the other end, by a roll-off piston and so encloses an air spring volume within its interior space. The rolling-lobe flexible member itself comprises rubber or a rubber-like plastic having attachment beads at its respective ends. The end of the rolling-lobe flexible member disposed at the cover plate is usually attached by flanging and, for this reason, the upper cover plate is also known as a flanged plate.

A flanged plate of this kind mostly includes an essentially planar base and an annularly-shaped rim arranged perpendicularly to the base. The transition from the base to the rim of the flanged plate is provided by a convex arc portion having a radius clearly less than the perpendicular extent of the rim.

The flanging procedure itself corresponds to the swage flanging known from form shaping technology. The flanged plate is disposed with its opening facing downwardly in an annularly-shaped closed lower flanging tool open upwardly. The lower part of the lower flanging tool has a nose-shaped projecting annular shoulder whose diameter is less than the diameter of the rim of the flanged plate. Referring to FIG. 3, a flanging tool is shown schematically. The flanged plate is identified by reference numeral 1 and the lower flanging tool by 2 and the upper flanging tool by 3. The nose-shaped annular shoulder is identified by reference numeral 4.

When flanging, the flanged plate is pressed from above by the upper flanging tool downwardly into the lower flanging tool. The lower edge of the rim of the flanged plate is bent inwardly by the nose-shaped annular shoulder of the lower flanging tool. The rim assumes the form of a torus which includes the upper-end attachment bead of a rubber rolling-lobe flexible member so that a tight and secure connection is established between the rolling-lobe flexible member and the flanged plate.

FIG. 4 shows a detail of a completed flanged rolling-lobe air spring 5 and shows the result of such a flanging procedure. The rim 6 of the flanged plate 1 is formed to have a torus shape about the bead 7 of a rolling-lobe flexible member 8. The base 9 of the flanged plate 1 is planar.

The rim is pressed back toward the base by the pressure exerted when pressing on the rim of the flanged plate. This operation is shown in FIG. 5. The flanged plate 1 is pressed against the upper flanging tool 3 by the force F. In this way, a material flow into the base 9 of the flanged plate 1 results which leads to the situation that the base 9 of the flanged plate 1 bulges to be concave or convex and thereby makes the flanged plate 1 unusable. In order to avoid this, and according to FIG. 6, the upper flanging tool 3 is usually equipped with holding grooves 10 defining sharp edges which, at the beginning of the pressing, dig into the surface of the flanged plate and so prevent the disadvantageous material flow. However, the surface of the flanged plate 1 is damaged which operates disadvantageously on a corrosion protection layer of the flanged plate 1 because this layer is penetrated by the sharp edges defined by the holding grooves 10. An organic corrosion protection layer is therefore completely ineffective at this location and therefore cannot be used.

SUMMARY OF THE INVENTION

It is an object of the invention to provide a method for making a rolling-lobe air spring wherein the flanged plate can be tightly flanged to the rolling-lobe flexible member without significant changes to the flanging tool described initially herein and without damaging the surface of the flanged plate having a planar base.

The method of the invention is for making a rolling-lobe air spring having a rolling-lobe resilient member and a flanged plate, the flanged plate having a base and a rim connected to the base via a convex arcuate portion of the flanged plate with the flanged plate being open facing toward the rolling-lobe resilient member. The method includes the steps of: placing the flanged plate in a lower flanging work tool; forming an annular continuous concave holding recess in the flanged plate rounded to have a shape corresponding to a circular arc when viewed in cross section and the recess having a depth less than the thickness of the flanged plate; the holding recess being located in the region of the convex arcuate portion and arranged in a complete revolution about the entire periphery of the flanged plate; coating the flanged plate with a corrosion protective layer; providing a convex holding bead, which is rounded to have a shape corresponding to a circular arc when viewed in cross section, on an upper flanging work tool corresponding to the holding recess of the flanged plate; during the flanging operation, when pressing down on the flanged plate utilizing the upper flanging work tool, bringing the holding recess of the flanged plate into contact engagement with the convex holding bead of the upper flanging work tool; and, forming the rim of the flanged plate form tight into a torus shape to grasp the bead of the rolling-lobe resilient member by pressing the flanged plate into the lower flanging work tool utilizing the upper flanging work tool.

This method affords the advantage that, because of the engagement of the holding recess and holding bead, a material flow from the rim into the base of the flanged plate is form tightly prevented without the surface of the flanged plate being damaged.

It is a further object of the invention to provide an apparatus for carrying out the method of the invention for making a rolling-lobe air spring which makes possible a damage-free flanging of the flanged plate having a planar base.

According to another feature of the invention, the upper flanging tool has at least one annularly-shaped rounded convex holding bead which corresponds to the at least one concave holding recess of the flanged plate. The holding bead can, during the flanging process, be brought into engagement with the at least one concave holding recess of the flanged plate when pressing down the flanged plate utilizing the upper flanging tool.

This arrangement affords the advantage that the holding bead, which is configured without sharp edges, does not penetrate through the surface of the flanged plate; instead, the bead engages into the corresponding holding recess of the flanged plate and thereby acts form tight against a material flow between the rim and the base of the flanged plate. In this way, damage to the surface layers of the flanged plate can be avoided.

According to another embodiment of the invention, the cross section of the at least one annularly-shaped convex holding bead of the upper flanging tool has a circular arc-shaped cross section having a radius of the circular arc between 2 mm and 30 mm.

This apparatus according to the invention affords the advantage that the flanged plate can be easily centered in the upper flanging tool because slight deviations from the ideal planar insert position of the flanged plate into the lower flanging tool compensate by themselves because of the circular arc-shaped form.

In a further embodiment of the invention, the convex holding bead of the upper flanging tool is arranged at an angle between 15° and 85° to the horizontal.

This arrangement affords the advantage that the prevention of the material flow from the rim to the base is obtainable in a wide region because of the geometric conditions and the material characteristics of the flanged plate.

It is a further object of the invention to provide a flanged plate having a rim and a base for a rolling-lobe air spring which can be flanged maintaining a planar base without damage to its surface without significant changes to the flanging tool described initially herein.

The flanged plate of the invention includes: a rim; a base for a rolling-lobe air spring; a convex arcuate portion connecting the rim to the base thereby forming the flanged plate having a convex outer surface at the convex arcuate portion; an annular continuous concave holding recess formed in the flanged plate at the convex outer surface and the concave holding recess having a depth less than the thickness of the flanged plate; a corrosion protective layer covering the flanged plate including the holding recess; and, the concave holding recess being arranged in a complete revolution about the entire periphery of the flanged plate.

This flanged plate according to the invention affords the advantage that, for a placed flanged plate, the holding beads in the upper flanging tool can be brought into contact engagement with the holding recesses of the flanged plate without damaging the surface of the flanged plate and, in this way, can form tightly prevent a material flow from the rim into the base of the flanged plate. The holding beads correspond to the holding recesses and are configured to be rounded to have a circular arcuate shape.

In a further embodiment of the invention, the cross section of the at least one annularly-shaped concave holding bead has a circularly arc-shaped cross section. The radius of the circular arc lies between 2 mm and 30 mm.

This embodiment affords the advantage that the flanged plate can be easily centered in the upper flanging tool because slight deviations from the ideal planar insert position of the flanged plate into the lower flanging tool can be compensated automatically because of the circular arc shape.

In a further embodiment of the invention, the concave holding bead is arranged in the region of the arc at an angle of between 15° and 85° to the planar base of the flanged plate.

This affords the advantage that the prevention of material flow from the rim to the base is achievable in a wide range with respect to geometric conditions and the material characteristics.

It is a further object of the invention to provide a rolling-lobe air spring whose flanged plate has a planar base after flanging to the rolling-lobe flexible member without damage to the surface in the region of the engagement between upper flanging tool and the flanged plate.

The rolling-lobe air spring of the invention includes: a rolling-lobe resilient member having a bead at an end thereof; a flanged plate including a rim, a planar base and a convex arcuate portion connecting the rim to the base; the flanged plate having a convex outer surface at the convex arcuate portion; the flanged plate having an annular continuous concave holding recess formed therein at the convex outer surface; the holding recess having a depth less than the thickness of the flanged plate and being arranged in a complete revolution about the entire periphery of the flanged plate; the flanged plate having a corrosion protective layer applied in advance of a flanging operation with the corrosion protective layer being applied so as to cover the flanged plate including the holding recess; and, the flanged plate being devoid of material flow between the rim and the planar base when the flanged plate is flanged to the bead of the resilient member when an upper flanging tool acts on the flanged plate by pressing down thereagainst with the holding recess being in contact engagement with a convex holding bead of the upper flanging work tool.

In a further embodiment of the invention, the concave holding recess of the flanged plate of the rolling-lobe air spring has a circular arcuately-shaped cross section having a radius of the circular arc between 2 mm and 30 mm.

This embodiment affords the advantage that the flanged plate can be easily centered in the upper flanging tool because slight deviations of the ideal planar placement position of the flanged plate into the lower flanging tool are automatically compensated because of the circular arc shape. In this way, a uniformity of the grasping of the bead of the rolling-lobe flexible member of the rolling-lobe air spring is improved.

In a further embodiment of the invention, the concave holding recess is arranged in the region of the arc at an angle between 15° and 85° to the planar base of the flanged plate.

This affords the advantage that the prevention of the material flow from the rim to the base is achievable in a wide range with respect to the geometric conditions and the material characteristics of the flanged plate.

With the solution of the invention, the rolling-lobe air spring has a planar base because of the flanging of the flanged plate without a large load on the surface while simultaneously preventing the material flow between rim and base of the flanged plate with the corrosion protection being maintained. In this way, rolling-lobe air springs with organically coated flanged plates are possible without damage of the organic protective layer.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
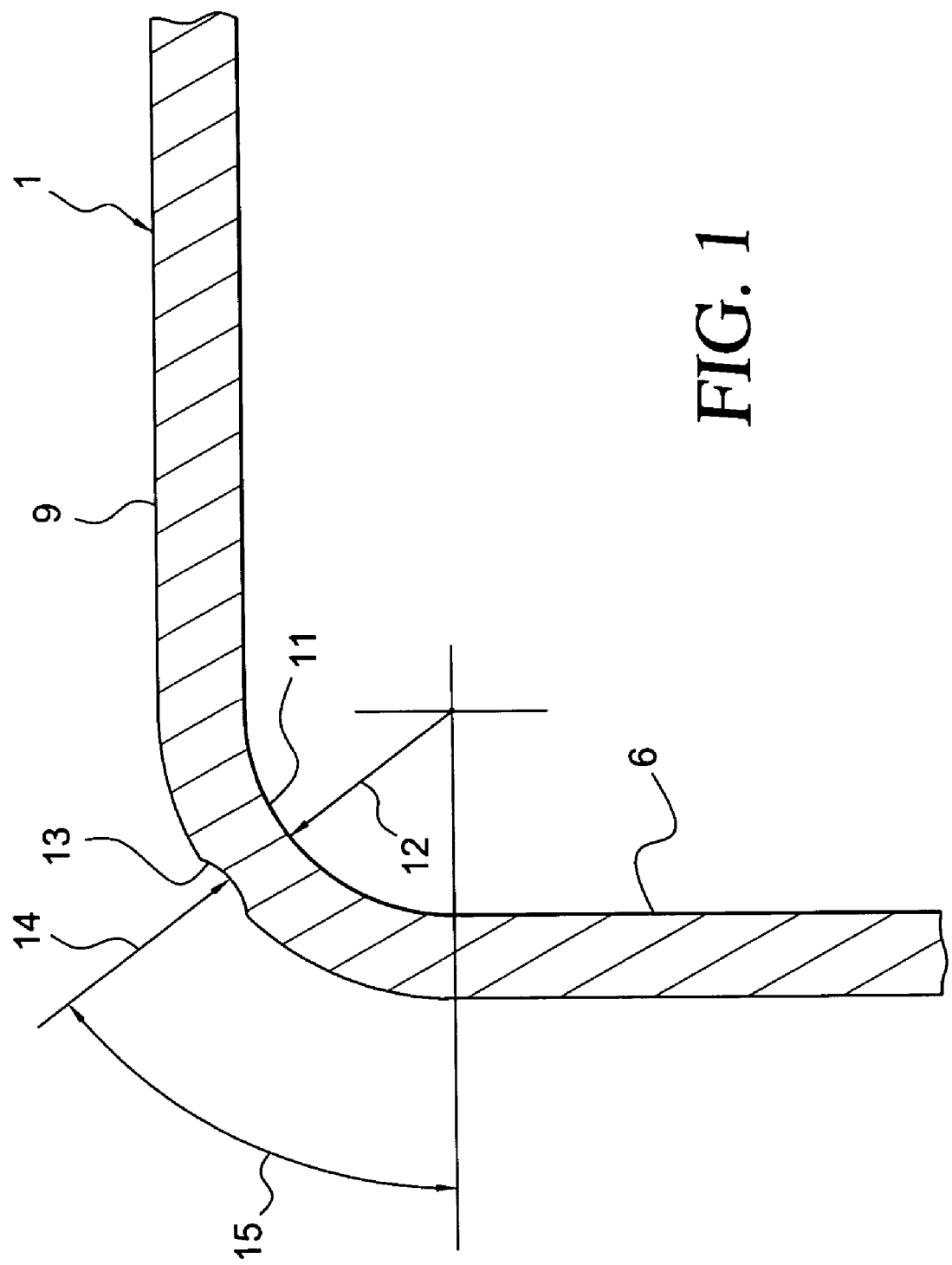
FIG. 1 shows a flanged plate according to the invention having a holding recess.

FIG. 1 shows a portion of a flanged plate 1 of the invention in cross section. The flanged plate 1 includes a base 9 and a rim 6. The base 9 and rim 6 are joined to each other via a convex arcuate portion 11 having a radius 12. In the region of the convex arcuate portion 11, the flanged plate 1 has a concave holding recess 13 having a radius 14 which is produced during the manufacturing process of the flanged plate 1. The radius 14 of the holding recess 13 is of the same order of magnitude as the radius 12 of the convex arcuate portion 11. The holding recess 13 is arranged at a position angle 15 in the region of the convex arcuate portion 11 and is operatively connected in a form-tight manner to a holding bead 16 (FIG. 2) at the tool end for preventing a material flow from the rim 6 via the convex arcuate portion 11 into the base 9.

Figure 2:
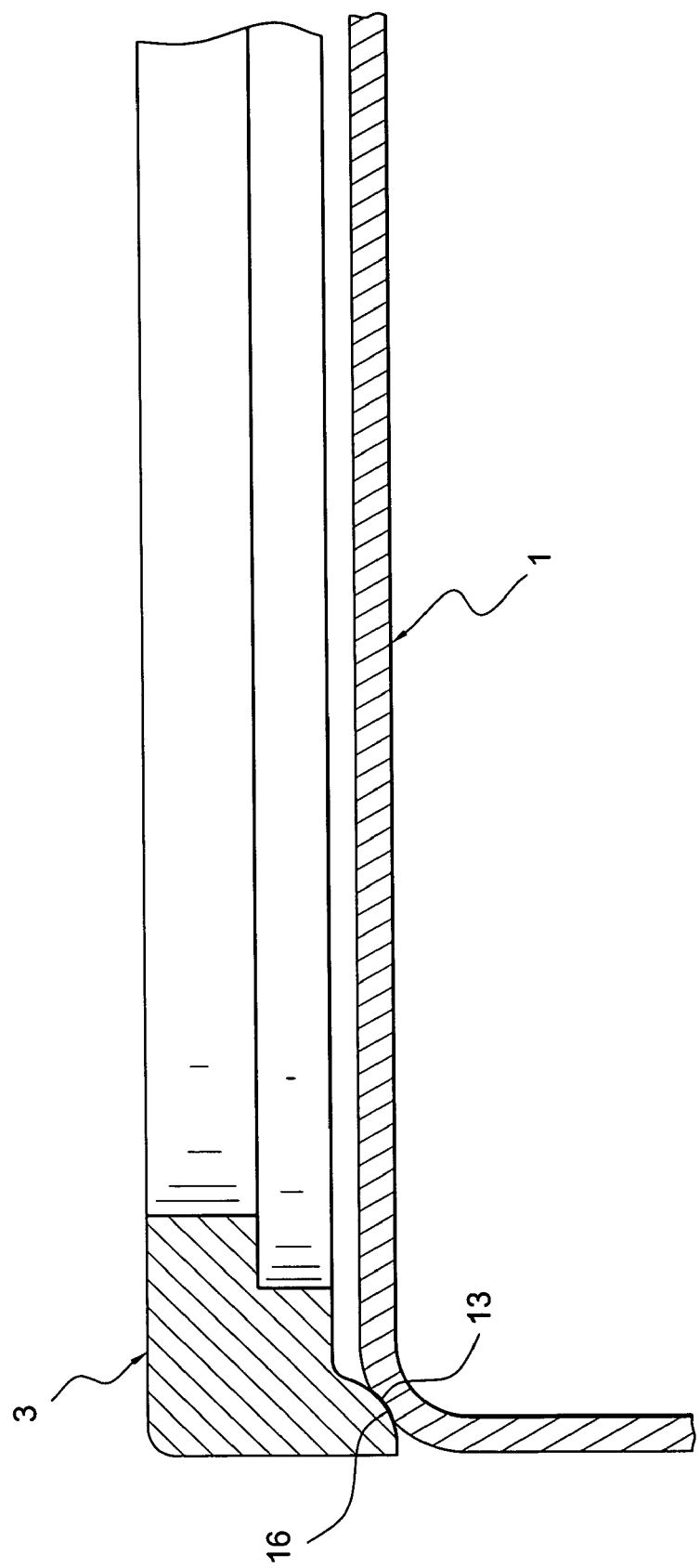
FIG. 2 shows the interaction of the holding recess and the upper flanging tool.
Figure 3:
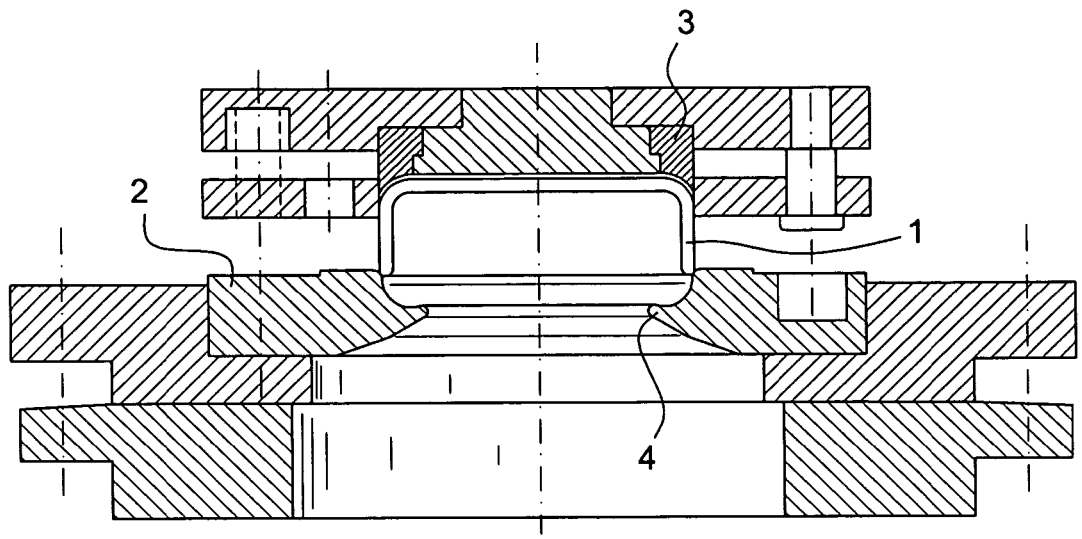
FIG. 3 shows a flanging tool according to the state of the art.
Figure 4:
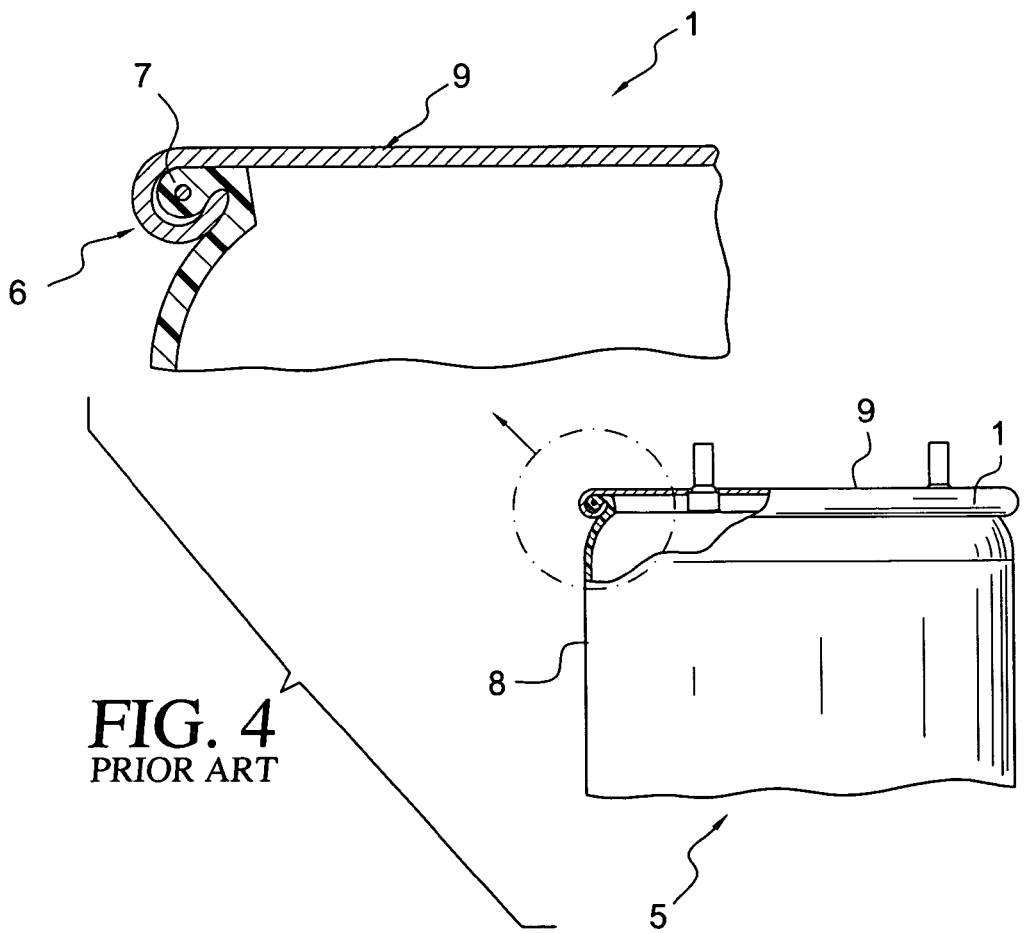
FIG. 4 shows a completed flanged rolling-lobe air spring according to the state of the art.
Figure 5:
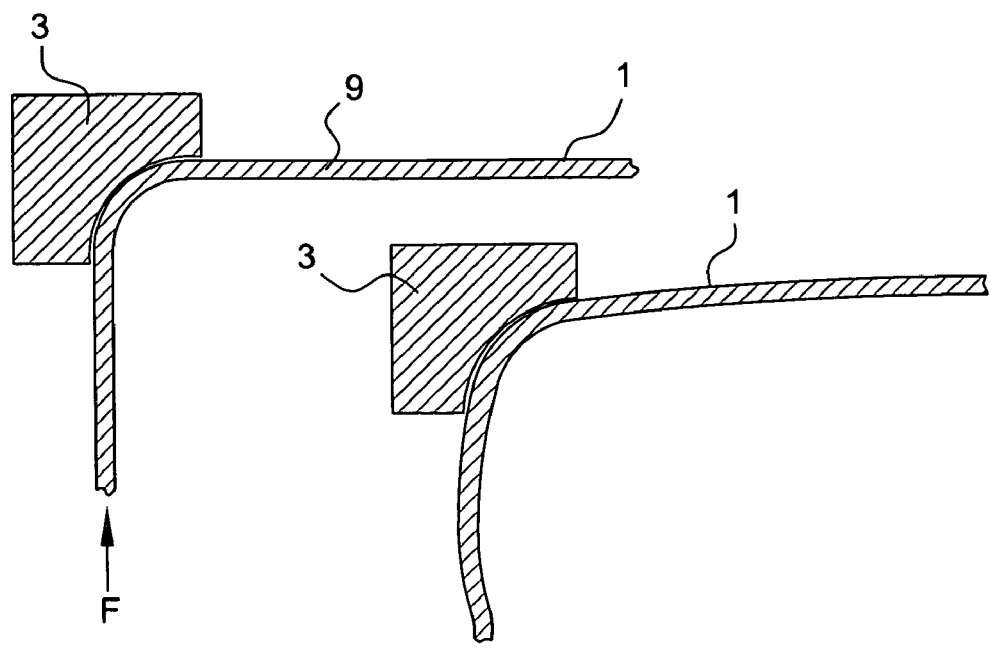
FIG. 5 shows the bending of the base of the flanged plate according to the state of the art; and, FIG. 6 shows holding grooves defining sharp edges of an upper flanging tool according to the state of the art.
Figure 6:
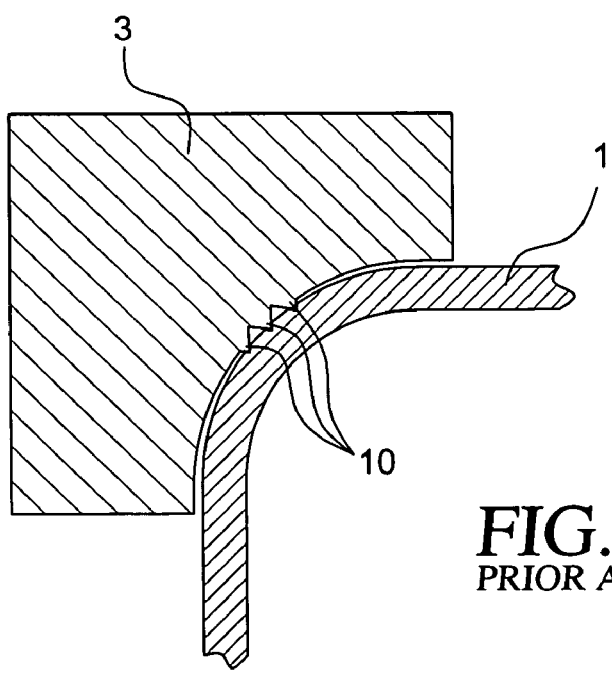

In FIG. 2, the interaction of the holding recess 13 and the upper flanging tool 3 is shown during flanging. The upper flanging tool 3 has the holding bead 16 which is configured to have a circular arc shape when viewed in section and is adapted to the radius 14 of the holding recess 13 of the flanged plate 1 and, during flanging, the holding bead 16 engages precisely into the holding recess 13. In this way, the material flow referred to above is prevented.

It is understood that the foregoing description is that of the preferred embodiments of the invention and that various changes and modifications may be made thereto without departing from the spirit and scope of the invention as defined in the appended claims.

What is claimed is:

1. A rolling-lobe air spring comprising:

a rolling-lobe resilient member having a bead at an end thereof;

a flanged plate including a rim, a planar base and a convex arcuate portion connecting said rim to said base;

said flanged plate having a convex outer surface at said convex arcuate portion;

said flanged plate having an annular continuous concave holding recess formed therein at said convex outer surface;

said holding recess having a depth less than the thickness of said flanged plate and being arranged in a complete revolution about the entire periphery of said flanged plate;

said flanged plate having a corrosion protective layer applied in advance of a flanging operation with said corrosion protective layer being applied so as to cover said flanged plate including said holding recess; and, said flanged plate being devoid of material flow between said rim and said planar base when said flanged plate is flanged to said bead of said resilient member when an upper flanging tool acts on said flanged plate by pressing down thereagainst with said holding recess being in contact engagement with a convex holding bead of the upper flanging work tool.

2. The rolling-lobe air spring of claim 1, wherein said concave holding recess has a shape corresponding to a circular arc when viewed in cross section and said circular arc has a radius in a range of between 2 and 30 mm.

3. The rolling-lobe air spring of claim 1, wherein said concave holding recess is arranged in the region of said convex arcuate portion at an angle of between 15° and 85° with respect to said planar base.

* * * * *